United States Patent [19]

Udagawa

[11] Patent Number: 4,759,585
[45] Date of Patent: Jul. 26, 1988

[54] STEEL LAMINATE GASKET WITH MESHING CORRUGATED BEADS

[75] Inventor: Tsunekazu Udagawa, Ichikawa, Japan

[73] Assignee: Ishikawa Gasket Co., Ltd., Tokyo, Japan

[21] Appl. No.: 67,567

[22] Filed: Jun. 26, 1987

[51] Int. Cl.$^4$ ............................................. F16J 15/08
[52] U.S. Cl. .............................. 277/235 B; 277/236; 277/200
[58] Field of Search ................. 277/233, 234, 235 R, 277/235 A, 235 B, 236, 200, 207 R, 211, 213, 215

[56] References Cited

U.S. PATENT DOCUMENTS

| | | | |
|---|---|---|---|
| 1,851,948 | 3/1932 | Summers | 277/211 |
| 2,397,597 | 4/1946 | Dunkle | 277/213 |
| 3,926,539 | 12/1975 | Lamm | 277/235 B X |
| 4,140,323 | 2/1979 | Jacobs | 277/207 R X |
| 4,196,913 | 4/1980 | Oka | 277/235 B |
| 4,471,968 | 9/1984 | Schlaupitz et al. | 277/235 B |
| 4,548,170 | 10/1985 | Forsthuber et al. | 123/198 E X |
| 4,676,515 | 6/1987 | Cobb | 277/235 B |

FOREIGN PATENT DOCUMENTS

| | | | |
|---|---|---|---|
| 2717663 | 10/1978 | Fed. Rep. of Germany | 277/235 B |
| 3245383 | 6/1984 | Fed. Rep. of Germany | 277/235 B |
| 59-226763 | 12/1984 | Japan | 277/235 B |
| 1057861 | 2/1967 | United Kingdom | 277/235 B |
| 2103308 | 2/1983 | United Kingdom | 277/235 B |
| 2121123 | 12/1983 | United Kingdom | 277/235 B |

Primary Examiner—Robert S. Ward
Attorney, Agent, or Firm—Frank J. Jordan; C. Bruce Hamburg; Manabu Kanesaka

[57] ABSTRACT

A steel laminate gasket for an internal combustion engine having at least one hole therein. The gasket comprises a first plate having at least one first hole and a first bead situated adjacent to the first hole to surround the same, and a second plate having at least one second hole and a second bead situated adjacent to the second hole to surround the same. The first and second holes correspond to the hole of the engine. The first and second beads include first and second top portions respectively. The distance from the second hole to the second top portion is different from the distance from the first hole to the first top portion. When the gasket is assembled, the first bead faces and abuts against the second bead so that the first and second top portions are located with a predetermined distance away from each other. Consequently, when the gasket is tightened, the first and second beads diagonally push with each other to provide secure sealing therebetween.

14 Claims, 3 Drawing Sheets

STEEL LAMINATE GASKET WITH MESHING CORRUGATED BEADS

BACKGROUND OF THE INVENTION AND RELATED ART STATEMENT

The present invention relates to a steel laminate gasket for an internal combustion engine, which can provide strong sealing pressure between two engine parts.

The steel laminate gasket of the invention can be used widely, such as a regular gasket situated between two engine blocks, cylinder head gasket and manifold gasket. Further, in the gasket of the present invention, cylinder holes Hc, water holes Hw, oil holes Ho, bolt holes Hb and the like, as shown in FIG. 1, can be easily and securely sealed.

In the steel laminate gasket, one of the very important things when the steel laminate gasket is designed is how portions around holes of the engine are securely sealed. If the portions around the holes of the engine are not properly sealed, the engine does not operate as intended. In this respect, there have been proposed many methods.

One of conventional methods for sealing around holes, such as a cylinder hole Hc, is shown in FIG. 2, wherein a gasket 20 comprises an upper plate 21, a lower plate 24, a middle plate 22, and a middle plate 23 having a bead 23a around a cylinder hole Hc to be sealed. The lower plate 24 is provided with a curved portion 24a located around the hole Hc, and a flange portion 24b situated above the upper plate 21. In the gasket 20, the curved portion 24a together with the bead 23a seals around the hole Hc.

When the gasket 20 is assembled, after the plates are stacked together, the curved portion 24a must be bent. In this respect, in case a hole to be sealed is small, configuration of the hole is complicated or metal quality relative to bending is not good, a curved portion may crack. If a crack is formed on the bending portion, sealing ability of the gasket decreases, and therefore the gasket can not be used any more. Therefore, the bending portion can not be employed for sealing all kind of holes.

When the curved or bending portion is not used, a gasket 25 as shown in FIG. 3 may be used. The gasket 25 comprises an upper plate 26, a lower plate 28 and a middle plate 27 having a bead 27a around a hole Hc. In this gasket 25, the bead 27a only provides a sealing pressure around the hole Hc. Therefore, fluid passing through the hole Hc may possibly permeate through the plates. The sealing ability of the gasket 25 is not good.

Accordingly, one object of the present invention is to provide a steel laminate gasket, which can provide high sealing pressure around a hole to be sealed for properly sealing therearound.

Another object of the invention is to provide a steel laminate gasket as explained above, which can seal properly even in a small hole or a hole with a complicated configuration.

A further object of the invention is to provide a steel laminate gasket as explained above, which can be easily and economically manufactured.

Further objects and advantages of the invention will be apparent from the following description of the invention.

SUMMARY OF THE INVENTION

A steel laminate gasket of the invention is used for an internal combustion engine having at least one hole therein. The gasket comprises a first plate having at least one first hole and a first bead situated adjacent to the first hole to surround the same, and a second plate having at least one second hole and a second bead situated adjacent to the second hole to surround the same. The first and second holes correspond to the hole of the engine. The first bead includes a first top portion, while the second bead includes a second top portion. The distance from the first hole to the first top portion is slightly different from the distance from the second hole to the second top portion.

When the first and second plates are assembled together, the first bead faces and abuts against the second bead so that the first and second top portions are located with a predetermined distance away from each other. Accordingly, when the gasket is tightened, the first and second beads diagonally push with each other to provide secure sealing therebetween.

The size, i.e. width, height and thickness, of the first and second beads may be the same. However, the size of the first bead may be different from the size of the second bead to change location or area where the sealing pressure is formed.

The second plate may be provided, further, with a third bead situated adjacent to the second bead. The distance between the second and third beads is substantially the same as the width of the first bead. When the first and second plates are assembled together, the first bead is located between the second and third beads on the second plate. Therefore, when the first and second plates are tightened together, expansion of the beads is restricted together. As a result, high sealing pressure is formed by the beads.

The steel laminate gasket may further include a soft film or layer situated between the first and second plates. The soft film prevents liquid from entering between the plates to securely seal therebetween. The soft film may be formed on one of the first and second plates by coating.

DETAILED DESCRIPTION OF PREFERRED EMBODIMENTS

Figure 1:
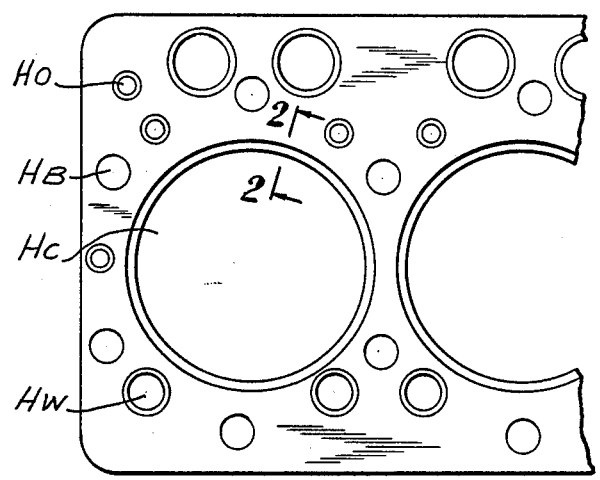
FIG. 1 is a partial plan view of a conventional cylinder head gasket.
Figure 2:
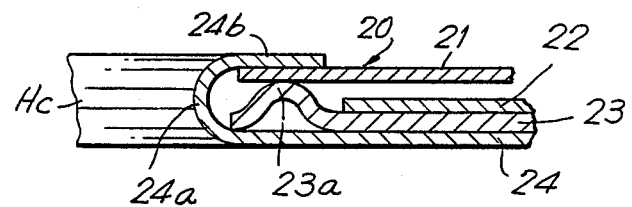
FIG. 2 is an enlarged section view taken along line 2—2 in FIG. 1.
Figure 3:
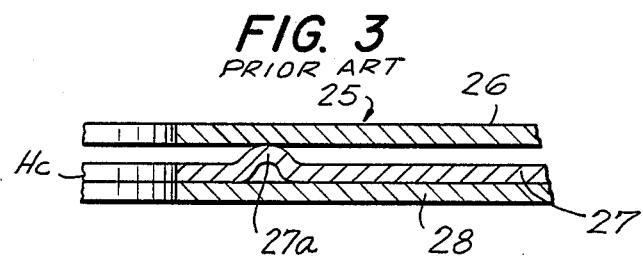
FIG. 3 is a section view similar to FIG. 2 for showing a different conventional gasket.
Figure 4:
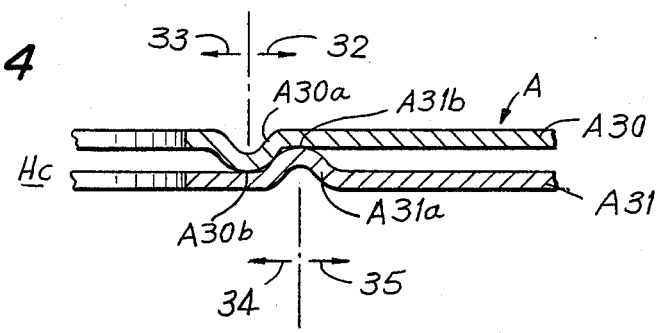
FIG. 4 is an explanatory section view, similar to FIG. 2, of a first embodiment of a steel laminate gasket of the present invention.
Figure 5:
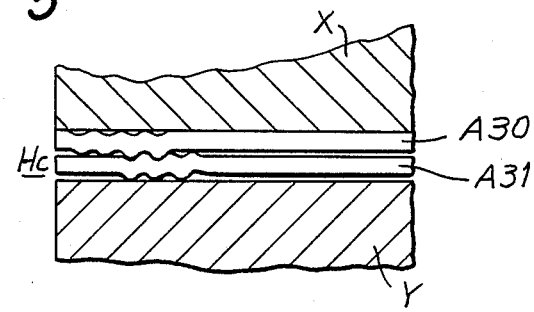
FIG. 5 is an explanatory section view for showing a condition that the gasket as shown in FIG. 4 is tightened between cylinder blocks.

Referring to FIGS. 4 and 5, a first embodiment A of a steel laminate gasket of the invention is shown. The gasket A as shown in FIGS. 4 and 5 is a cylinder head gasket, similar to FIG. 1, and is provided with a plurality of holes, i.e. cylinder holes Hc, water holes Hw, oil holes Ho and bolt holes Hb. Areas around the cylinder holes Hc, water holes Hw and oil hoes Ho are designed to be sealed in accordance with the present invention. For explanaation, an area adjacent the cylinder hole Hc is shown as section views in FIGS. 4 and 5. The structures around the water holes Hw and oil holes Ho are, except size, the same as the structure as shown in FIGS. 4 and 5. Therefore, explanation around the water holes Hw and oil holes Ho is eliminated.

The gasket A comprises an upper plate A30 with a bead A30$a$ around a cylinder hole Hc, and a lower plate A31 with a bead A31$a$ around the cylinder hole Hc. The bead A30$a$ is provided with a top portion A30$b$, while the bead A31$a$ is provided with a top portion A31$b$. The top portions A30$b$, A31$b$ are located at a predetermined distance away from the cylinder hole Hc, respectively. The distance between the cylinder hole Hc and the top portion A30$b$ is shorter the distance between the cylinder hole Hc and the top portion A31$b$. It is important that the top portions A30$b$, A31$b$ do not abut against each other, and curved outer shoulders of the beads A30$a$ and A31$a$ abut against each other.

Therefore, when the gasket A is situated between cylinder blocks X, Y, and is tightened by bolts (not shown) passing through the cylinder blocks, the beads A30$a$, A31$a$ are, at first, pushed vertically. As a result, the bead A30$a$ tries to move in the directions shown by arrows 32, 33, and the bead A31$a$ tries to move in the directions shown by arrows 34, 35. A portion of the bead A30$a$ at a side of the arrow 32 and a portion of the bead A31$a$ at a side of the arrow 34 push against each other. These portions do not substantially move in any direction and form a strong sealing pressure thereat.

As a pressure applied to the beads A30$a$, A31$a$ exceeds a predetermined level, a plurality of corrugated beads are formed on the beads A30$a$, A31$a$. Some of the corrugated beads on the bead A30$a$ mesh with and diagonally push against some of the corrugated beads on the bead A31$a$. As a result, high sealing pressure is formed by the gasket A of the invention.

The gasket A is used for the cylinder head gasket, but the features of the gasket A may be applied to the manifold gasket as well. The present invention can properly operate as the manifold gasket.

Figure 6:
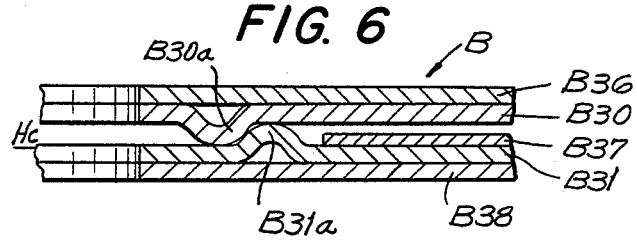
FIG. 6 is a section view, similar to FIG. 4, of a second embodiment of a steel laminate gasket of the invention.

FIG. 6 shows a second embodiment B of a steel laminate gasket of the invention. The gasket B comprises an upper outer plate B36, a lower outer plate B38, two plates B30, B31 and a pressure regulation plate B37. The plates B30, B31 are provided with beads B30$a$, B31$a$ respectively, to operate as in the plates A30, A31. The gasket B is provided with the pressure regulation plate B37 between the plates B30, B31. Therefore, an amount of a sealing pressure applied to the beads B30$a$, B31$a$ can be regulated. The gasket B can provide a strong sealing pressure as in the gasket A.

Figure 7:
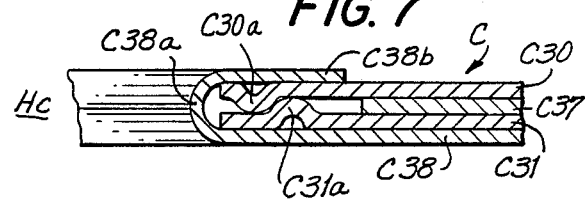
FIG. 7 is a section view, similar to FIG. 4, of a third embodiment of a steel laminate gasket of the invention.

FIG. 7 shows a third embodiment C of a steel laminate gasket of the present invention. The gasket C comprises plates C30, C31, a pressure regulation plate C37 and a lower outer plate C38. The plate C30, C31 are provided with beads C30$a$, C31$a$ respectively, to operate as in the plates A30, A31. The pressure regulation plate C37 situated between the plates C30, C31 regulates pressure applied to the beads C30$a$, C31$a$. The plate C38 is provided with a curved portion C38$a$ surrounding edge portions of the plates C30, C31 adjacent the cylinder hole Hc, and a flange C38$b$ situated above the plate C30.

In the gasket C, the area around the cylinder hole Hc is covered by the curved portion C38$a$ to thereby securely seal therearound. Also, outsides of the beads C30$a$, C31$a$ are covered by the flange C38$b$ and the plate C38, so that high and even sealing pressure is obtained.

Figure 8:
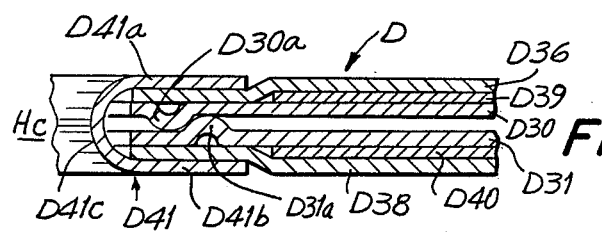
FIG. 8 is a section view, similar to FIG. 4, of a fourth embodiment of a steel laminate gasket of the invention.

FIG. 8 shows a fourth embodiment D of a steel laminate gasket of the present invention. The gasket D comprises an upper outer plate D36, a lower outer plate D38, plates D30, D31, middle plates D39, D40, and a grommet D41 covering edges of the plates adjacent the cylinder hole Hc. The plates D30, D31 are provided with beads D30$a$, D31$a$ respectively, to operate as in the plates A30, A31. The grommet D41 includes an upper flange D41$a$ situated above the plate D36, a lower flange D41$b$ situated outside the plate D38, and a curved portion D41$c$.

In the gasket D, the area around the cylinder hole Hc is covered by the curved portion D41$c$ to thereby securely seal therearound. Also, outsides of the beads D30$a$, D31$a$ are covered by the outer plates D36, D38 and flanges D41$a$, D41$b$, so that high and even sealing pressure is obtained.

Figure 9:
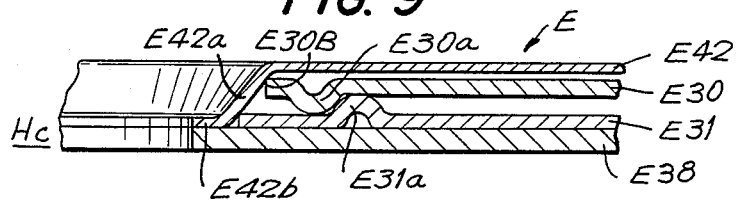
FIG. 9 is a section view, similar to FIG. 4, of a fifth embodiment of a steel laminate gasket of the invention.

FIG. 9 shows a fifth embodiment E of a steel laminate gasket of the present invention. The gasket E comprises an upper outer plate E42, an lower outer plate E38, and plates E30, E31. The plates E30, E31 are provided with beads E30$a$, E31$a$, respectively and operate as in the plates A30, A31. The plate E42 is provided with a shoulder portion E42$a$ and an edge portion E42$b$. An edge E30$b$ of the plate E30 abuts against the shoulder portion E42$a$, and the edge portion E42$b$ is securely connected by spot welding to the plate E38.

When the gasket E is tightened, the beads E30$a$, E31$a$ operate as in the beads A30$a$, A31$a$. In addition, since the movement of the edge E30$b$ toward the cylinder bore Hc is restricted by the shoulder portion E42$a$, high sealing pressure occurs at the bead E30$a$. Consequently, the gasket E can provide high sealing pressure when comparing the gasket A.

Figure 10:
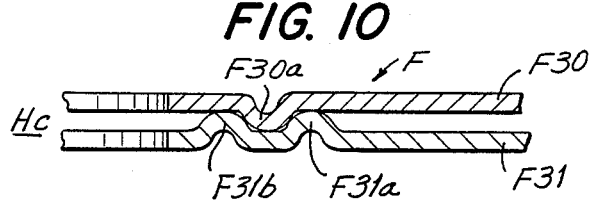
FIG. 10 is a section view, similar to FIG. 4, of a sixth embodiment of a steel laminate gasket of the invention.

FIG. 10 shows a sixth embodiment F of a steel laminate gasket of the present invention. The gasket F comprises a plate F30 having a bead F30$a$, and a plate F31 having beads F31$a$, F31$b$. The distance between the beads F31$a$, F31$b$ is substantially the same as the width of the bead F30$a$. When assembled, the bead F30$a$ is located between the beads F31$a$, F31$b$.

When the gasket F is tightened, the lateral expansion of the bead F30$a$ in the directions toward and away from the cylinder bore Hc is restricted by the beads F31$a$, F31$b$, while the lateral expansion of the beads F31$a$, F31$b$ toward the bead F30$a$ is restricted as well. As a result, high sealing pressure is formed by the beads of the gasket F at an area larger than that of the gasket A.

Figure 11:
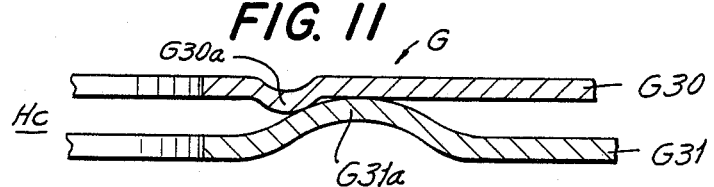
FIG. 11 is a section view, similar to FIG. 4, of a seventh embodiment of a steel laminate gasket of the invention.

FIG. 11 shows a seventh embodiment G of a steel laminate gasket of the present invention. The gasket G comprises a plate G30 having a bead G30a, and a plate G31 having a bead G31a. The size, i.e. width and height, of the bead G31a is greater than the size of the bead G30a. When the gasket G is tightened, the bead G30a forms a strong sealing pressure at a narrow area, while the bead G31a forms a relatively low sealing pressure at a wide area. The size and quality, i.e. width, height, hardness and thickness, of the bead are selected according to the sealing condition.

Figure 12:
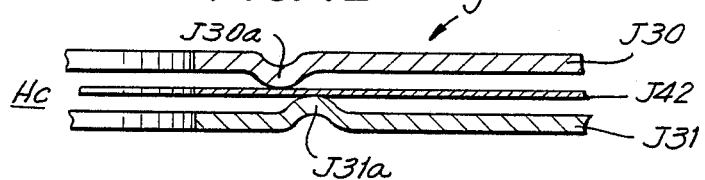
FIG. 12 is a section view, similar to FIG. 4, of an eighth embodiment of a steel laminate gasket of the invention.

FIG. 12 shows an eighth embodiment J of a steel laminate gasket of the present invention. The gasket J comprises a plate J30 having a bead J30a, a plate J31 having a bead J31a, and a thin soft film J42 between the plates J30, J31. The film J42 may be made of a plastic, rubber, graphite or aluminum having heat resistant property. If the film J42 is deleted from the gasket J, the gasket J is exactly the same as the gasket A.

When the gasket J is tightened, the film J42 deforms at an area of the beads J30a, J31a to conform thereto and seals between the plates J30, J31. The gasket J operates as in the gasket A. Further, since the soft film is placed between the plates J30, J31, sealing ability is improved.

Figure 13:
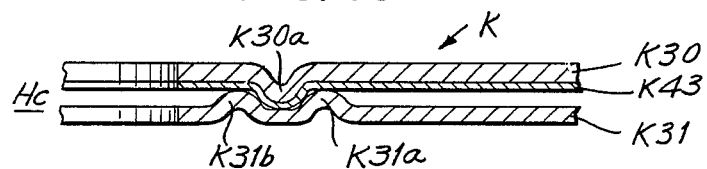
FIG. 13 is a section view, similar to FIG. 4, of a ninth embodiment of a steel laminate gasket of the invention.

FIG. 13 shows a ninth embodiment K of a steel laminate gasket of the present invention. The gasket K comprises a plate K30 having a bead K30a, a plate K31 having beads K31a, K31b, and a coating K43 on the plate K30. The coating K43 may be a plastic or rubber having heat resistant property. If the coating K43 is deleted from the gasket K, the gasket K is exactly the same as the gasket F. The gasket K operates as in the gasket F. Further, since the coating K43 is formed on the plate K30, sealing ability between the plates K30, K31 is improved.

In the present invention, a gasket is at least provided with two plates having beads thereon. When the plates are assembled together, curved shoulder portions of the beads abut against each other. Consequently, when the gasket is tightened, diagonal forces occur at the beads and push against each other. As a result, a strong sealing pressure is formed on the beads to thereby seal around a hole.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising:
   a first plate having at least one first hole therein corresponding to the hole of the engine, and a first bead situated adjacent to the first hole to surround the same and having a first top portion, and
   a second plate having at least one second hole therein corresponding to the first hole of the first plate, and a second bead situated adjacent to the second hole to surround the same and having a second top portion, distance from the second hole to the second top portion being different from distance from the first hole to the first top portion so that when the first and second plates are assembled together, the first and second top portions face with each other and are located with a predetermined distance away from each other, said first and second beads, when the gasket is tightened, diagonally pushing with each other so that a plurality of corrugated beads are formed on the first and second beads, said corrugated beads on the first and second plates partly meshing with each other to provide secure sealing therebetween.

2. A steel laminate gasket according to claim 1, further comprising a lower plate situated outside the first plate, said lower plate having a curved portion situated inside the first and second holes, and a flange located above the second plate.

3. A steel laminate gasket according to claim 1, further comprising an upper plate situated above the second plate and having an upper plate hole corresponding to the hole of the engine, and a lower plate situated under the first plate and having a lower plate hole corresponding to the hole of the engine, said upper and lower plates substantially covering the first and second plates.

4. A steel laminate gasket according to claim 3, further comprising a grommet having an upper flange situated outside the upper plate, a lower flange situated outside the lower plate, and a curved portion integrally formed with the upper and lower flanges, said curved portion being located inside the holes of the first and second plates and the upper and lower plates.

5. A steel laminate gasket according to claim 1, wherein said second plate further includes a third bead situated adjacent to the second bead, distance between the second and third beads being substantially the same as width of the first bead, said first bead, when the first and second plates are assembled together, being situated between the second and third beads on the second plate to provide high sealing pressure by the beads.

6. A steel laminate gasket according to claim 5, further comprising a soft film situated between the first and second plates to securely seal therebetween.

7. A steel laminate gasket according to claim 6, wherein said soft film is formed on one of the first and second plates by coating.

8. A steel laminate gasket according to claim 1, further comprising a soft film situated between the first and second plates to securely seal therebetween.

9. A steel laminate gasket according to claim 8, wherein said soft film is formed on one of the first and second plates by coating.

10. A steel laminate gasket according to claim 8, wherein said soft film is formed of one material selected from soft metal sheet, rubber, plastic and graphite.

11. A steel laminate gasket for an internal combustion engine having at least one hole therein, comprising:
    a first plate having at least one first hole therein corresponding to the hole of the engine, and a first bead situated adjacent to the first hole to surround the same and having a first top portion,
    a second plate having at least one second hole therein corresponding to the first hole of the first plate, an inner edge around the second hole, and a second bead situated adjacent to the second hole to surround the same and having a second top portion, distance from the second hole to the second top portion being different from distance from the first hole to the first top portion, said first bead of the first plate, when assembled, facing and abutting against the second bead of the second plate so that the first and second top portions are located with a predetermined distance away from each other, whereby when the gasket is tightened, the first and second beads diagonally push with each other to provide secure sealing therebetween, a lower plate situated under the first plate to substantially cover the first plate and having a lower plate hole corresponding to the hole of the engine, and an upper plate situated above the second plate to substantially cover the second plate, said upper plate including an upper plate hole corresponding to the hole of the engine, a diagonal portion extending toward the lower plate, said inner edge of the second plate abutting against the diagonal portion so that when the gasket is tightened, the inner edge of the second plate does not move toward the hole of the engine to thereby provide strong sealing pressure to the beads, and an inner portion integrally formed with the diagonal portion and situated adjacent to the hole of the engine.

12. A steel laminate gasket according to claim 11, wherein said inner portion of the upper plate is firmly connected to the lower plate.

13. A steel laminate gasket for an internal combustion engine having at least one hole therein, comprising:

a first plate having at least one first hole therein corresponding to the hole of the engine, and a first bead situated adjacent to the first hole to surround the same and having a first top portion, and a second plate having at least one second hole therein corresponding to the first hole of the first plate, and a second bead situated adjacent to the second hole to surround the same, said second bead having a size different from that of the first bead to change sealing pressure formed on the first and second beads and a second top portion, distance from the second hole to the second top portion being different from distance from the first hole to the first top portion, said first bead of the first plate, when assembled, facing and abutting against the second bead of the second plate so that the first and second top portions are located with a predetermined distance away from each other, whereby when the gasket is tightened, the first and second beads diagonally push with each other to provide secure sealing therebetween.

14. A steel laminate gasket for an internal combustion engine having at least one hole therein, comprising:

a first plate having at least one first hole therein corresponding to the hole of the engine, and a first bead situated adjacent to the first hole to surround the same and having a first top portion and two first shoulder portions on both sides of the first top portion, and a second plate having at least one second hole therein corresponding to the first hole of the first plate, a second bead situated adjacent to the second hole to surround the same and having a second top portion and two second shoulder portions on both sides of the second top portion, distance from the second hole to the second top portion being shorter than distance from the first hole to the first top portion, and a third bead situated outside the second bead relative to the second hole and having a third top portion and two third shoulder portions on both sides of the third top portion, distance between the second and third beads being substantially the same as width of the first bead, said first bead, when the first and second plates are assembled, being located between the second and third beads on the second plate so that the first shoulder portions of the first bead face against the second shoulder portion and third shoulder portion, whereby when the gasket is tightened, the shoulder portions of the first bead diagonally push the respective shoulder portions of the second and third beads to thereby provide high sealing pressure by the beads.

* * * * *